United States Patent [19]

Tsikos

[11] Patent Number: 4,547,898

[45] Date of Patent: Oct. 15, 1985

[54] APPARATUS FOR DETERMINING THE TWO-DIMENSIONAL CONNECTIVITY OF A PRESCRIBED BINARY VARIABLE ASSOCIATED WITH A SURFACE

[75] Inventor: Constantine J. Tsikos, Pennsauken, N.J.

[73] Assignee: Siemens Corporate Research & Support, Inc., Iselin, N.J.

[21] Appl. No.: 474,408

[22] Filed: Mar. 11, 1983

[51] Int. Cl.[4] .............................................. G06K 9/28
[52] U.S. Cl. ........................................ 382/4; 382/26; 382/27
[58] Field of Search ........................................ 382/4–5, 382/26–28, 35, 41, 49; 250/208–209, 578

[56] References Cited

U.S. PATENT DOCUMENTS

| 3,622,989 | 11/1971 | Dowdy | 382/4 |
| 3,781,855 | 12/1973 | Killen | 382/4 |
| 3,794,983 | 2/1974 | Sahin | 382/28 |
| 3,859,633 | 1/1975 | Ho et al. | 382/5 |
| 3,964,021 | 6/1976 | Tamches | 382/49 |

Primary Examiner—Leo H. Boudreau
Attorney, Agent, or Firm—John Francis Moran

[57] ABSTRACT

Apparatus is disclosed which is capable of determining the two-dimensional connectivity profile of a prescribed binary variable associated with a surface. This apparatus comprises a "connectivity-matrix" of switch cells and a two-dimensional sensory array of sensor cells. The sensor cells are responsive to the presence or absence of the binary variable and control corresponding ones of the switch cells in the connectivity matrix.

17 Claims, 27 Drawing Figures

| SIDE # | OFFSET | CONN. 1 = CONN 0 = DISCONN | SIDE # | OFFSET |
|---|---|---|---|---|
| 0 | 12 | 1 | 1 | 4,5 |
| 1 | 9,10 | 1 | 2 | 5,6,9 |
| 1 | 9,10 | 1 | 3 | 8 |
| 2 | 12 | 1 | 3 | 5 |
| 3 | 12,13 | 0 | – | – |

APPARATUS FOR DETERMINING THE TWO-DIMENSIONAL CONNECTIVITY OF A PRESCRIBED BINARY VARIABLE ASSOCIATED WITH A SURFACE

BACKGROUND OF THE INVENTION

The present invention relates to apparatus for determining the two-dimensional connectivity of a prescribed binary variable associated with a surface.

Examples of a binary variable of this type are (1) the presence or absence of a fingerprint ridge on the surface of a human finger; (2) the presence or absence of a line drawn or printed on a sheet of paper; and (3) the presence or absence of an electronic circuit lead on the surface of a printed circuit board. In these and other instances it is frequently desirable to determine the "connectivity" of this binary variable between remote points on the surface. That is, it is of importance to know whether the binary variable which is present at two separated points on the surface is also present at a series of contiguous points in between these separated points so that these separated points are, so to speak, "connected".

It is possible and, in fact, known to supply a digital computer with information about the presence or absence of a binary variable at all the points on a two-dimensional grid. Once this information is stored in memory, the computer may determine the connectivity within the two-dimensional binary pattern by means of a suitable software executed algorithm. One type of algorithm follows the so-called "brushfire logic" which involves starting with a grid point at which the binary variable has a value of logical "1", checking the binary variable at its neighboring grid points to determine those which also have a value of "1" (and are, therefore, considered to be "connected" to the initial grid point) and then repeating this procedure with the determined neighboring grid points as a starting point. By this procedure, a string of connected grid points may be followed in progression, much as a brush fire moves progressively along the ground by successively igniting adjacent, flammable parts of the undergrowth.

The brushfire logic algorithm is extremely inefficient, time-consuming and therefore costly in computer time. Frequently, the end result—namely, a connectivity profile of the binary variable—is simply not worth the time and cost of obtaining it.

SUMMARY OF THE INVENTION

It is an object of the present invention to provide apparatus which is capable of determining the two-dimensional connectivity profile of a prescribed binary variable associated with a surface.

It is a further object of the present invention to provide apparatus of the above-noted type which is capable of being implemented in hardware and thus requires little or no computer time.

It is a further object of the present invention to provide apparatus of the above-noted type which operates in parallel and is therefore faster than the brushfire logic algorithm referred to above.

These objects, as well as other objects which will become apparent from the discussion that follows, are achieved according to the present invention, by providing apparatus comprising the following combination of elements:

(a) a two-dimensional array of circuit nodes;

(b) a number of circuit, "on/off" switches, each connected between two adjacent circuit nodes;

(c) a two-dimensional array of sensors, each sensor being operative to sense the binary state of the above-mentioned variable at a respective grid point on the surface in question; and (d) means responsive to the individual sensors for controlling the circuit switches in dependence upon the individual states of the variable, as sensed by respective ones of the sensors.

In the apparatus according to the invention, each sensor is associated with a corresponding node in the respective array and two adjacent nodes are connected together by the switches whenever a given state (e.g. logical "1") of the variable is sensed by the sensors associated with the two adjacent nodes.

Preferably, each node has associated with it a plurality of switches interconnecting this node with each one of its neighboring nodes. All of these switches associated with a given node are controlled together to be in the "on" position or the "off" position, respectively, in dependence upon the binary state (logical "1" or "0") of the variable as determined by the sensor associated with that given node.

The foregoing and other objects, features and advantages of the invention will become apparent from the following, more particular description of the preferred embodiments of the invention, as illustrated in the accompanying drawings.

DESCRIPTION OF THE PREFERRED EMBODIMENTS

The preferred embodiments of the present invention will now be described in connection with FIGS. 1-13 of the drawings. Identical elements illustrated in the various figures are designated with the same reference numerals.

Figure 1:
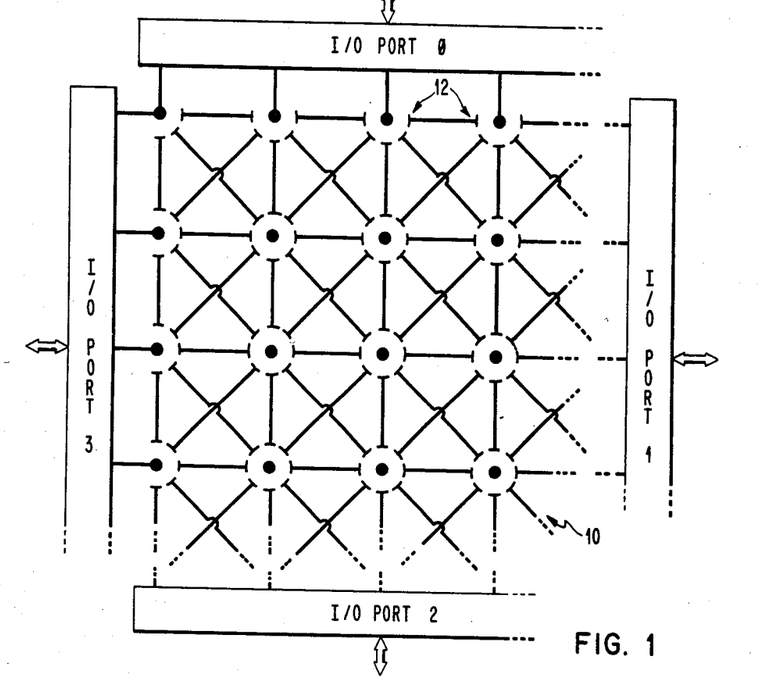
FIG. 1 is a schematic diagram showing a rectangular array of interconnected "switch cells" each switch cell comprising a circuit node surrounded by on/off switches.
Figures 2, 3:
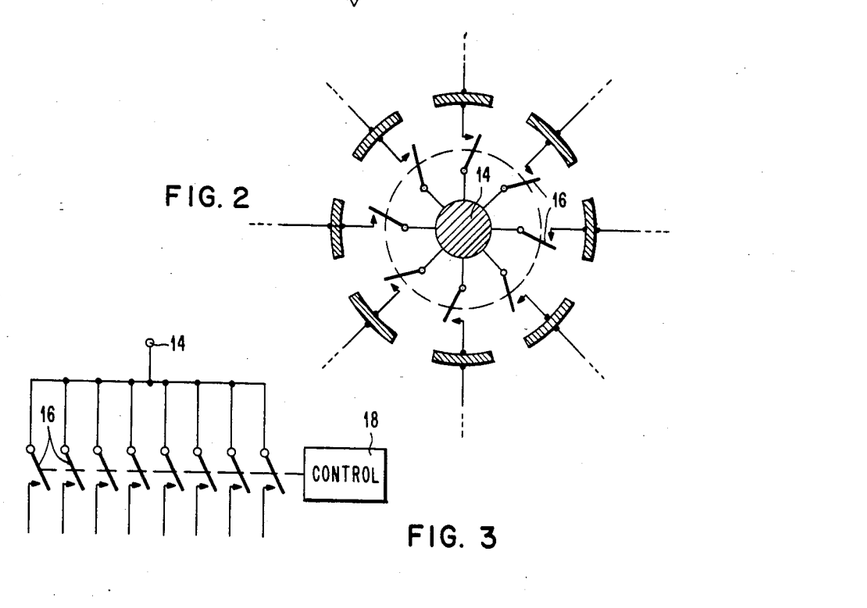
FIG. 2 is a schematic diagram of a switch cell assembly.
FIG. 3 is a schematic diagram of the circuit associated with the switch cell of FIG. 2.

FIG. 1 shows an array 10 of switch cells 12 arranged in a rectangular grid or matrix. Each switch cell 12 is connected to all of its neighbors and, if the cell is on the perimeter, to an input/output port in the manner shown. The cells are represented only diagrammatically in FIG. 1; their actual structure and operation are illustrated in FIGS. 2 and 3. A cell comprises a floating circuit node 14 (FIG. 2) connected to and surrounded by a number of on/off switches 16. These switches are thus connected in parallel (FIG. 3) and are controlled simultaneously by a single control device 18. When the control device is in the logical "0" position, all switches are open. When the control device is in the logical "1" position, all switches are closed. The control device may comprise a solenoid which mechanically actuates the switch contacts, as shown, or it may comprise an amplifier driver, which applies a voltage to electronic (e.g. transistor) switches.

Figure 4:
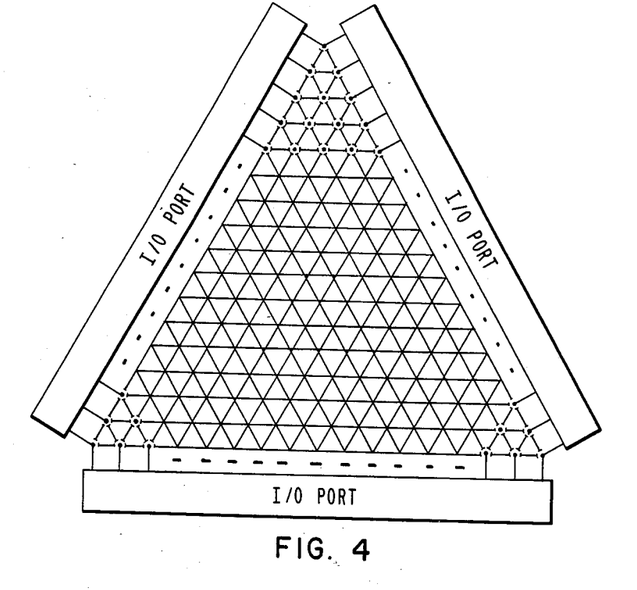
FIG. 4 is a schematic diagram of a triangular array of switch cells.
Figure 5:
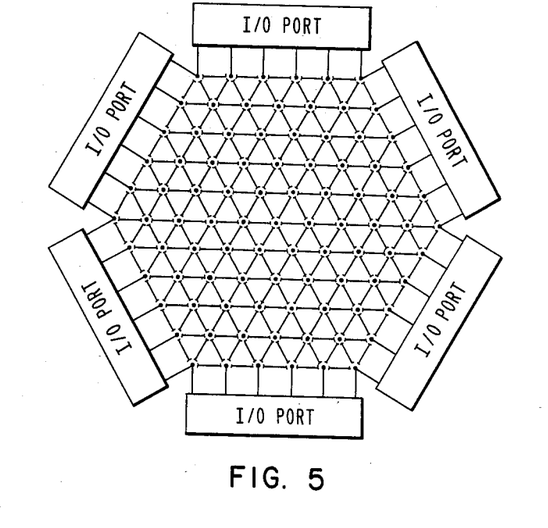
FIG. 5 is a schematic diagram of a hexagonal array of switch cells.

In the rectangular array shown in FIG. 1, the switch cells are connected to each one of their eight neighbors (with the exception of those switch cells on the perimeter which do not have eight neighbors). FIGS. 4 and 5 show the switch cells arranged in a triangular and hexagonal arrays, respectively, wherein the switch cells are connected to only six neighboring cells. In these two embodiments, each cell is equidistant from its six neighbors.

In the embodiment of FIG. 1, there are provided four banks of input/output ports connected to the respective four sides of the rectangular array. In the embodiments of FIGS. 4 and 5, there are provided three banks and six banks of input/output ports, respectively, as shown.

Figure 6:
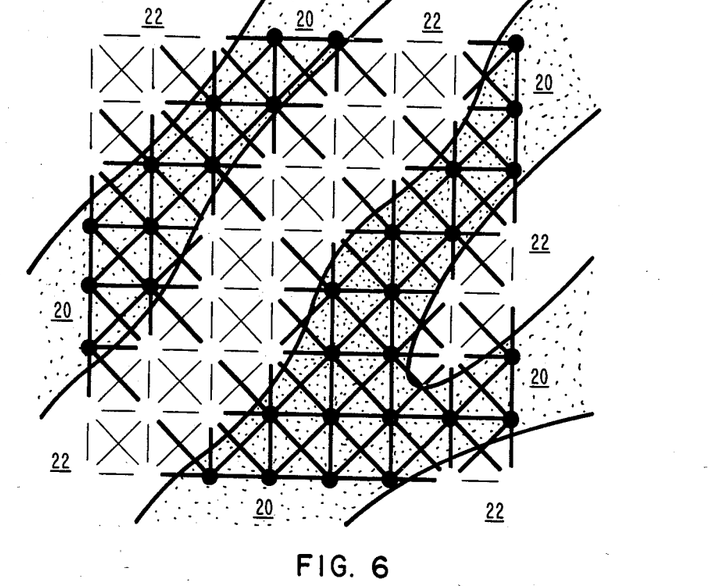
FIG. 6 is a diagram of a rectangular array of switch cells superimposed on a surface containing a binary pattern.

FIG. 6 illustrates an 8×8 rectangular array of switch cells superimposed upon a small section of a fingerprint pattern. Both the array and the pattern are greatly enlarged from their actual size. It will be understood that the array may be made in any size desired to suitably match the geometry of the binary variable that is to be analyzed.

In this case, the binary variable is the presence or absence of fingerprint ridges on a finger surface. These ridges are indicated by the darkened areas 20 in FIG. 6. The light areas 22 between the darkened areas represent the fingerprint valleys. FIG. 6 illustrates how each switch cell is controlled by the binary state of the variable on the surface immediately beneath it. In the symbolism of FIG. 6, all the switches 16 of a switch cell are indicated as being "on" (switches closed) by the presence of a black dot at the node point. The switches are indicated as being "off" (open) by the absence of the black connecting dot. Heavy lines designate a link (circuit path) connected to at least one switch cell with its switches "on"; light lines designate a link (circuit path) which is not connected to any switch cell with its switches "on".

Figure 7:
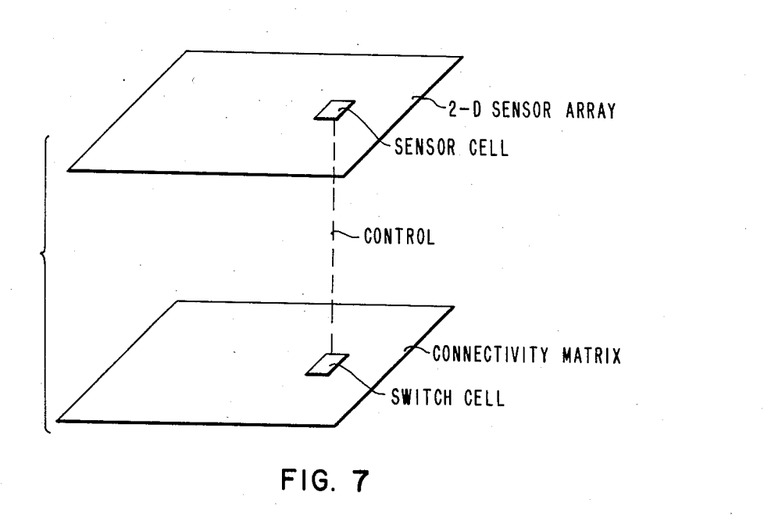
FIG. 7 is a diagram showing a two-dimensional array of sensors associated with a two-dimensional array of switch cells.

FIG. 7 shows how the two-dimensional array of circuit nodes and switches (switch cells), hereinafter called a "connectivity matrix", is associated with a two-dimensional array of sensors (sensor cells) which actually sense the binary states of the variable (e.g., fingerprint ridges) at the respective points on the surface (e.g., finger surface).

For ease of understanding, there is shown a one to one correspondence in the size and shape of the sensor array and the connectivity matrix; however, this one-to-one corrspondence is not required. It is necessary only that the sensor cells be an appropriate size for the real-world binary variable to be sensed. The connectivity matrix may be larger, or smaller, although it is desirable that each sensor cell be connected to control the switches of a single switch cell.

An an example, the sensor cells may be photocells arranged in a two-dimensional array which receives light that is reflected from a finger surface pressed against a platen. Such fingerprint sensing devices are well known in the art and are disclosed, for example, in the U.S. Pat. Nos. 4,358,677 and 4,340,300.

As will be explained below in connection with FIG. 12, the connectivity matrix is useful in connection with fingerprint sensing to quickly identify "features" or "minutiae" in a fingerprint that are of interest for further investigation. This initial selection of features avoids extensive preprocessing of unimportant fingerprint information by a computer, thus saving computer time and speeding the fingerprint identification process. In fact, due to the highly parallel nature of the sensor/-connectivity matrix combination, the connectivity determination according to the present invention can be carried out in real time.

Various other sensor arrays may be used to control the switch cells of the connectivity matrix so as to derive real time connectivity information. Examples of such sensor arrays are x-ray detector arrays, infrared detetor arrays, microwave detector rays, ultrasound detector arrays, geophone detector arrays, pressure detector arrays, temperature detector arrays, and tension detector arrays. With most of these arrays, the signal produced by each individual sensor in response to light, x-ray, infrared, etc., must be amplified and then passed to a threshold detector, such as a Schmitt trigger, which determines whether the signal is above or below the threshold of recognition. The signals produced by the sensors are thus digitized and the resultant digital signals are used to control the switch cells.

It will be understood that the digital signals derived from the sensor array may also be stored in a memory as binary information. The switch cells of the connectivity matrix may therefore be controlled indirectly from this binary information stored in memory.

FIGS. 8-11 illustrate the process for determining connectivity of the electrical circuit on a printed circuit board using the connectivity-determining apparatus according to the present invention. FIGS. 8A-8I show a small area or "window" of the PC board having conductive material 32 imprinted thereon. In this example, the electrical circuit has two irregularities or faults; namely a "crack" 34 and a "bridge" or "cross-over" 36. The purpose of the connectivity-determining procedure is to identify and locate such faults.

Figure 8A:
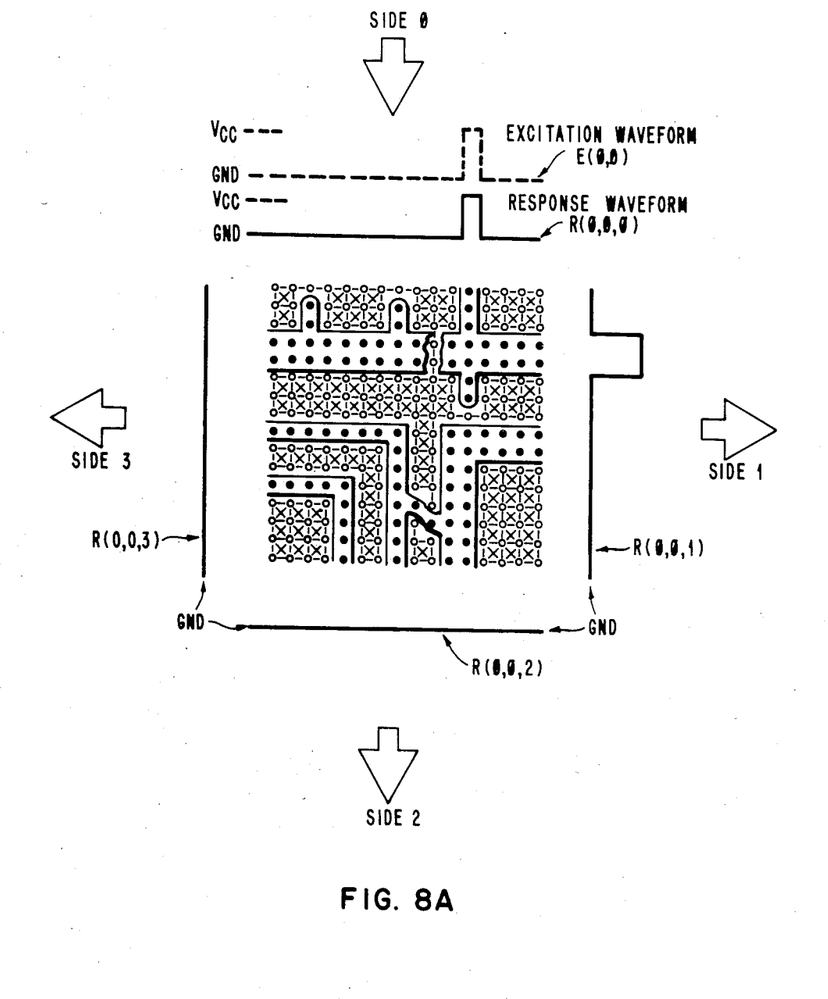
FIGS. 8A–8I are representational diagrams illustrating successive steps of the connectivity-finding procedure according to the present invention as applied to a printed circuit board.
Figure 8B:
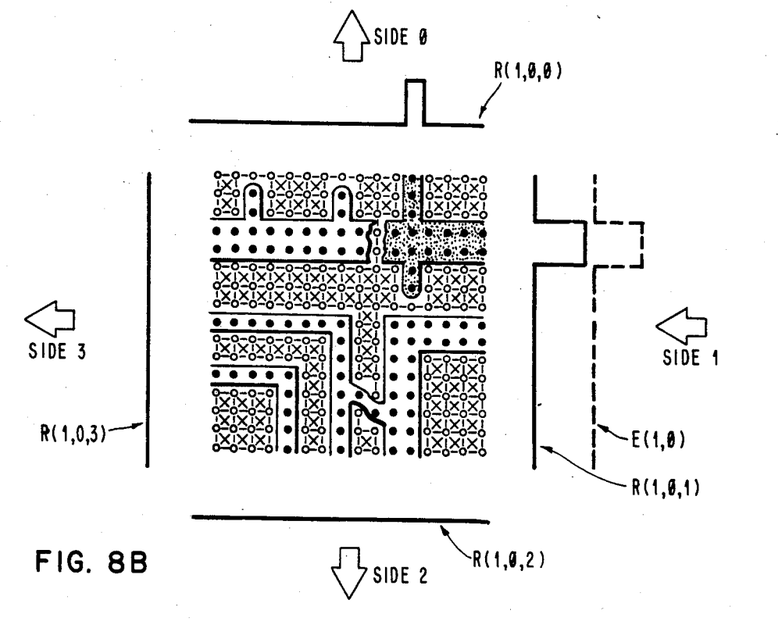
Figure 8C:
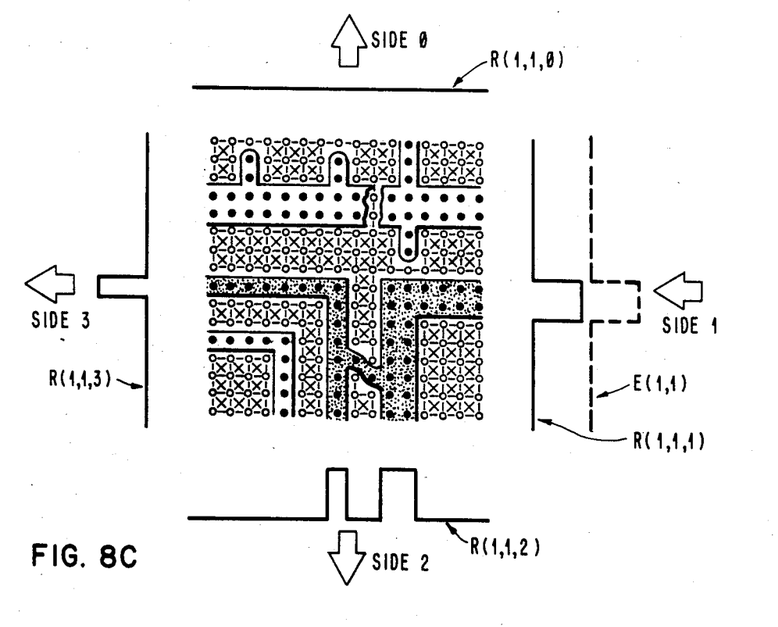
Figure 8D:
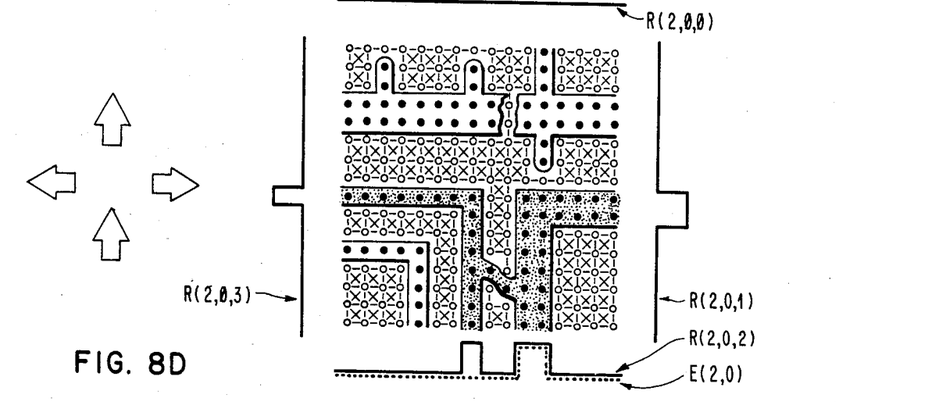
Figure 8E:
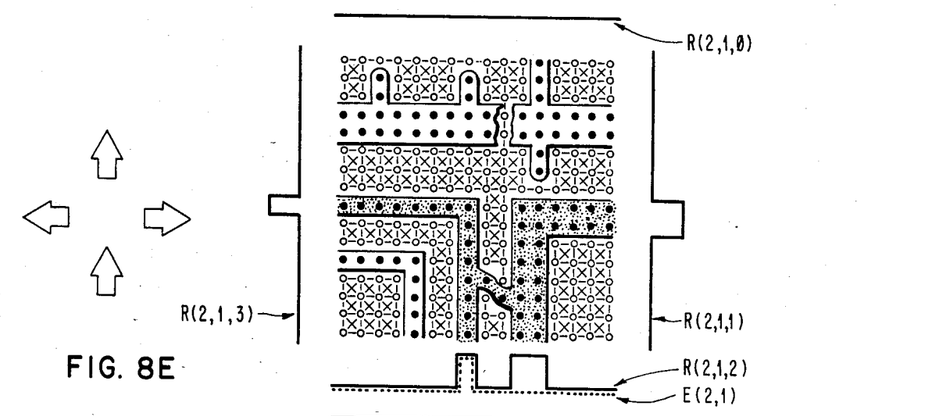
Figure 8F:
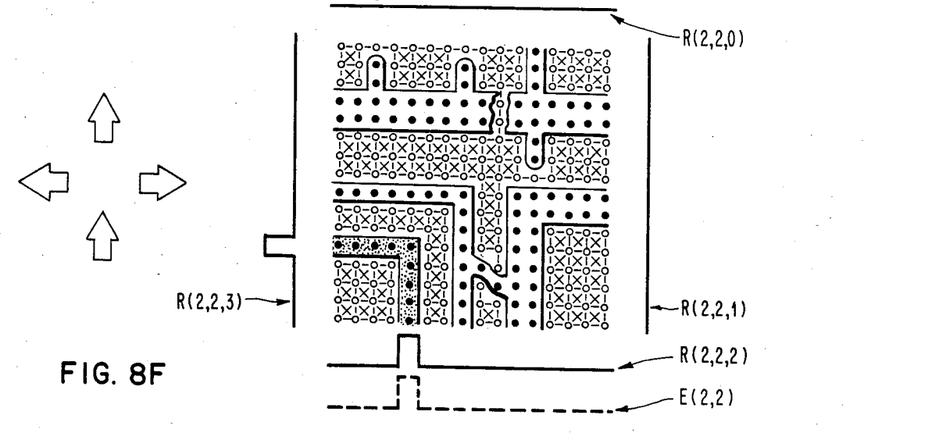
Figure 8G:
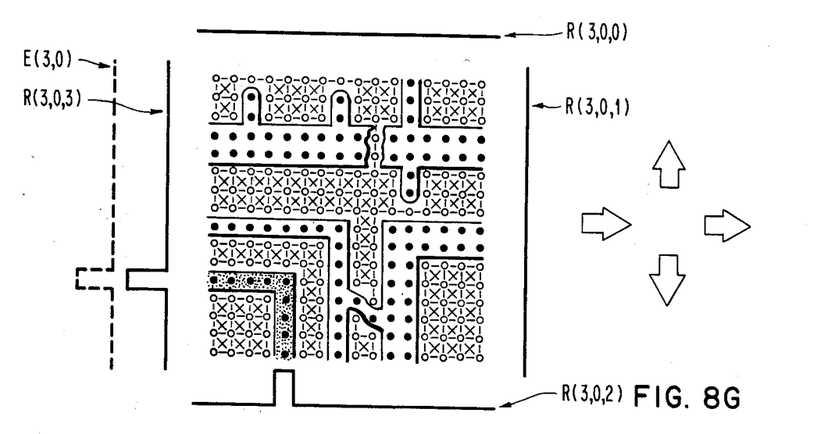
Figure 8H:
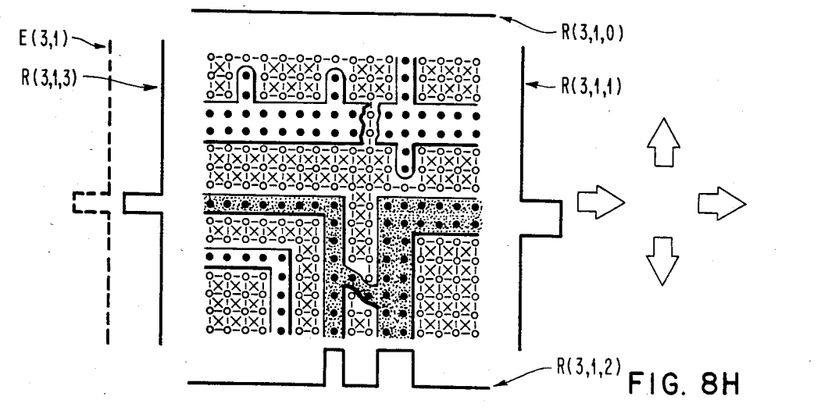
Figure 8I:
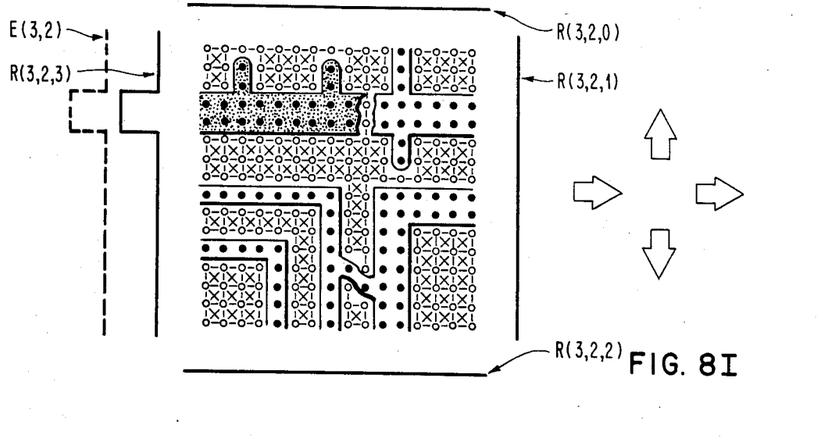

According to the procedure, the PC board "window", is excited at each point on each side where the electrical circuit extends to the perimeter. Thus, in FIG. 8A, an excitation waveform E is applied to the point 38 on side 0, and the response waveform R to this excitation is observed for all sides of the PC board. As shown in FIG. 8A, the excitation applied to the point 38 produces a response at side 0 only at this point. On side 1, a response waveform R indicates an electrical circuit at the perimeter point 40. However the excitation produces no response waveforms at sides 2 and 3 because the electrical circuits reaching the perimeter of these sides are not electrically connected to the point 38.

The response waveforms produced by successive excitation of each of the electrical leads on the perimeter are illustrated in FIGS. 8B-8I. The portion of the electrical circuit which conducts the excitation signal is darkened in each case for ease of understanding.

Figure 9A:
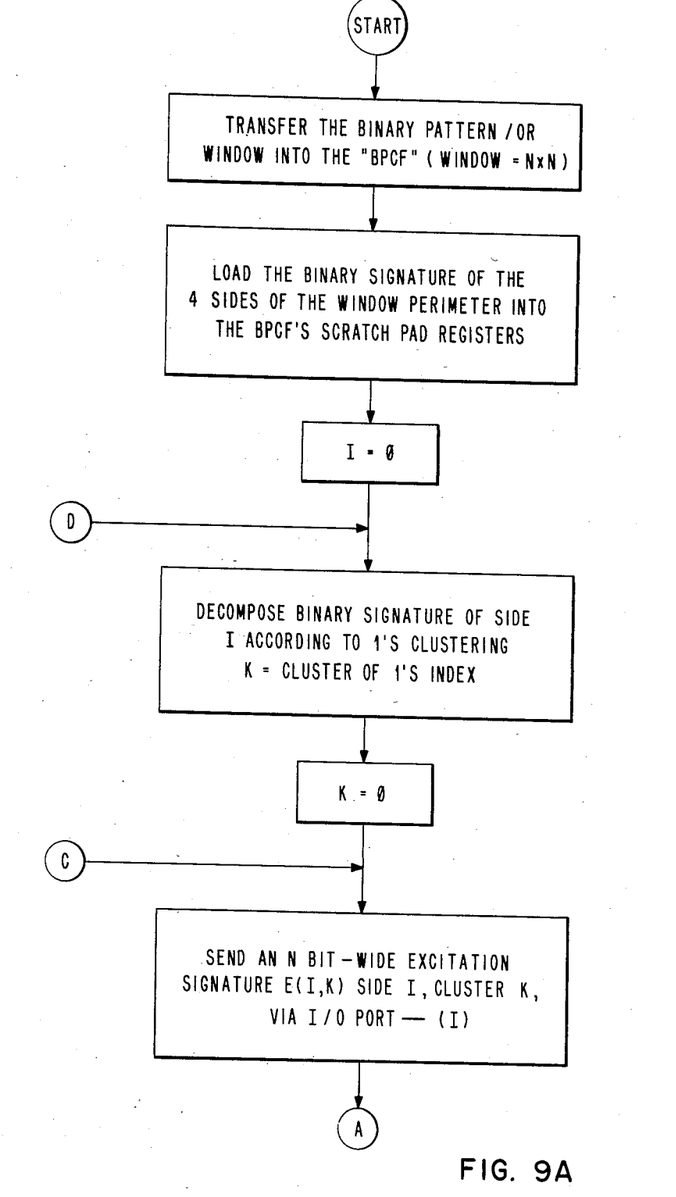
FIGS. 9A and 9B are a flow chart of the connectivity-finding process, according to a preferred embodiment of the present invention.
Figure 9B:
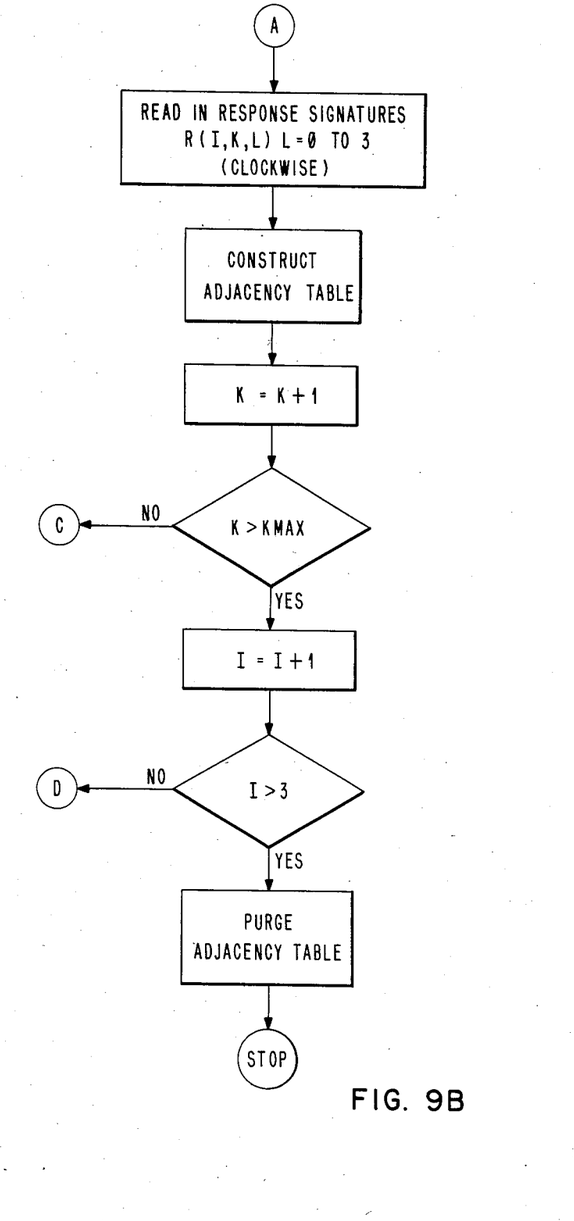
Figure 10:
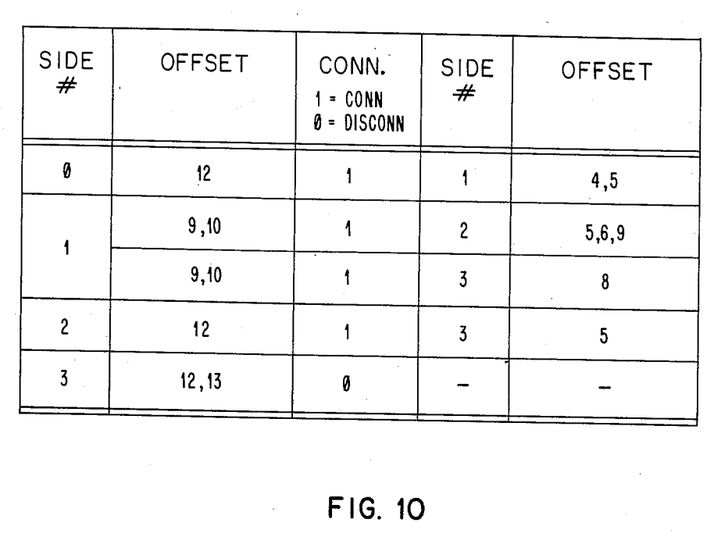
FIG. 10 is a table listing the results of the connectivity-finding procedure of FIGS. 8A–8I.
Figure 11:
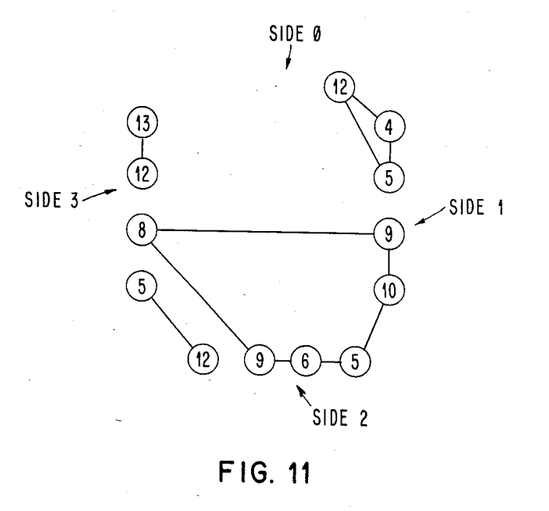
FIG. 11 is a connectivity graph illustrating the connectivities set forth in the table of FIG. 10.

FIGS. 9A and 9B shows a flow chart of the process of determining connectivity. The purpose of this process is to construct an "adjacency table" as indicated in FIG. 10 and, from this adjacency table, a "connectivity graph", as illustrated in FIG. 11. The connectivity table and/or graph can then be matched against a PC board model for detection of faults (cracks or solder bridges) in the window area under test.

The connectivity finding process according to the present invention permits fast, optical testing of PC boards. Optical testing has several definite advantages over the traditional contact testing methods. The key advantage, however, is that no mechanical contacts are required. This fact is important as PC boards become so dense that contact testing can prove inaccurate or even damaging, depending upon probe sizes and press forces.

Fault detection in multilayered PC boards is also possible if x-ray projections are used and the sensors are replaced with suitable x-ray detectors, such as sodium iodide crystal scintillation counters.

Another area of application for the connectivity finding apparatus of the present invention is fingerprint analysis. In fingerprint analysis it is desirable to determine if the center of the viewing window is connected to any points on the perimeter. If they are so connected, it is desirable to determine which points are connected. This specialized use of the connectivity finding apparatus will now be described in connection with FIGS. 12 and 13.

Figure 12:
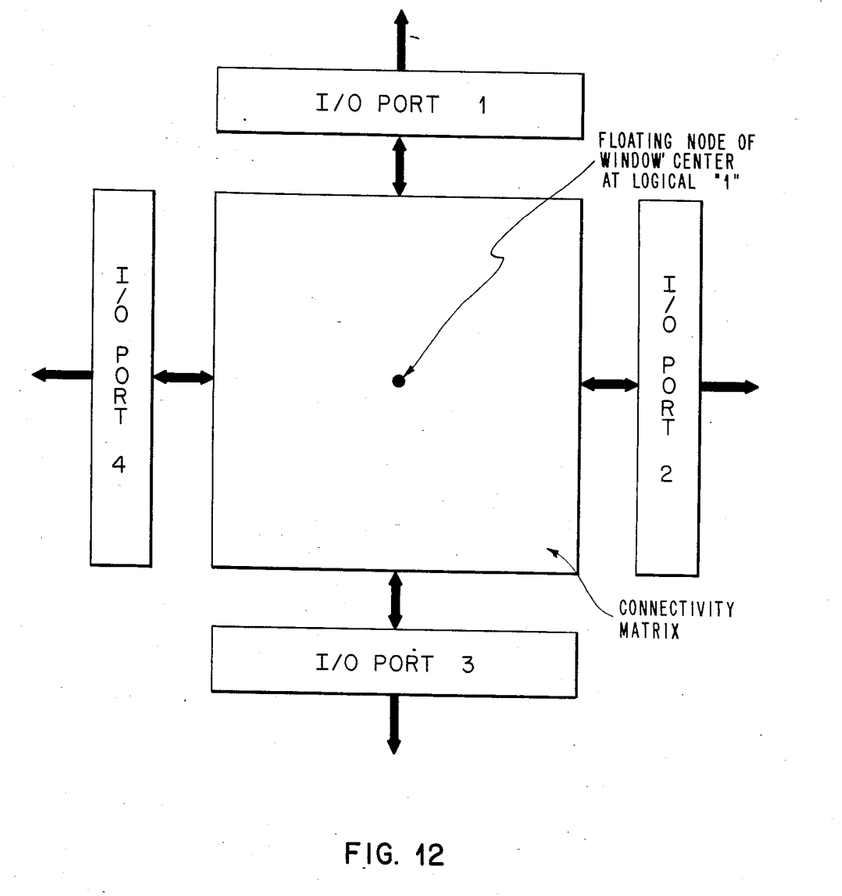
FIG. 12 is a block diagram of a rectangular array of switch cells, suitable for use in fingerprint analysis.

FIG. 12 shows a connectivity matrix which is controlled by an array of optical sensors which "view" a small window area of a fingerprint. A signal representing a logical "1" (either a pulse or an appropriate voltage level) is applied to the floating node of the switch cell which lies at the center of the connectivity matrix. The signal response at the perimeter of the window is then examined, via the I/O ports, to determine the four signal "signatures" at the four sides.

Figure 13A:
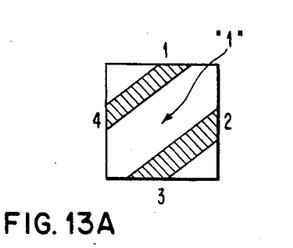
FIGS. 13A–13F illustrate the operation of the switch cell array of FIG. 11, as it is employed in fingerprint analysis.
Figure 13B:
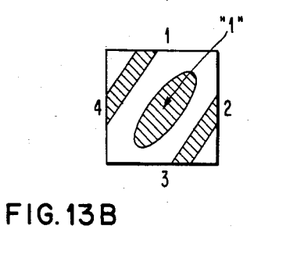

FIGS. 13A-13F illustrate six different portions of a fingerprint which may be seen by the connectivity determining apparatus. In the case of FIG. 13A, the application of a logical "1" to the switch cell at the center of the connectivity-matrix will produce no signals at the four sides because this switch cell will not be connected to any switch cells which surround it. Similiarly, with the fingerprint pattern shown in FIG. 13B, the logical "1" applied to the central switch cell will not be propagated outward to the perimeter because the central switch cell and the switch cells surrounding it to which it is connected form an island that is not connected to any switch cells at the perimeter. However, with the pattern shown in FIG. 13C, the central switch cell will be connected to switch cells extending out to the perimeter at sides 3 and 4.

The following table illustrates the binary patterns of the signals appearing at the four sides of the connectivity matrix for each of the fingerprint patterns shown in FIG. 13:

TABLE

| FIGURE | SIDE | SIGNATURE |
|--------|------|-----------|
| 13A | 1 | 0 . . . 0 |
| 13A | 2 | 0 . . . 0 |
| 13A | 3 | 0 . . . 0 |
| 13A | 4 | 0 . . . 0 |
| 13B | 1 | 0 . . . 0 |
| 13B | 2 | 0 . . . 0 |
| 13B | 3 | 0 . . . 0 |
| 13B | 4 | 0 . . . 0 |
| 13C | 1 | 0 . . . 0 |
| 13C | 2 | 0 . . . 0 |
| 13C | 3 | 0 . . . 01 . . . 1 |
| 13C | 4 | 1 . . . 10 . . . 0 |
| 13D | 1 | 0 . . . 0 |
| 13D | 2 | 0 . . . 01 . . . 10 . . . 0 |
| 13D | 3 | 0 . . . 0 |
| 13D | 4 | 0 . . . 01 . . . 10 . . . 0 |
| 13E | 1 | 0 . . . 01 . . . 10 . . . 0 |
| 13E | 2 | 0 . . . 01 . . . 10 . . . 0 |
| 13E | 3 | 0 . . . 01 . . . 1 |
| 13E | 4 | 10 . . . 0 |
| 13F | 1 | 0 . . . 01 . . . 10 . . . 0 |
| 13F | 2 | 0 . . . 01 . . . 10 . . . 0 |
| 13F | 3 | 0 . . . 01 . . . 10 . . . 0 |
| 13F | 4 | 0 . . . 01 . . . 10 . . . 0 |

Figure 13C:
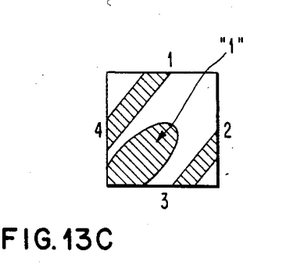
Figure 13D:
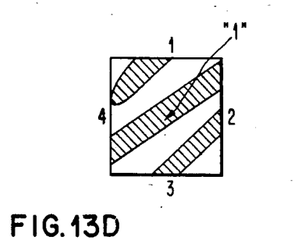
Figure 13E:
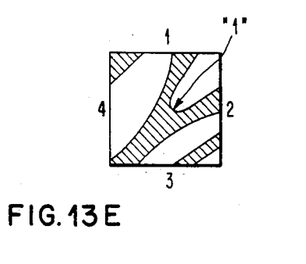
Figure 13F:
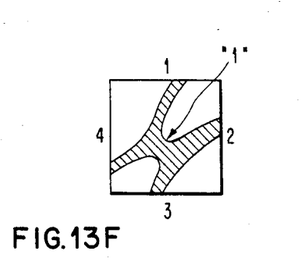

It may be seen that the signal signatures shown on the table indicate the presence of certain fingerprint features. Thus, the signatures for FIG. 13C show that a fingerprint ridge terminates within the viewing window and the signatures for FIGS. 13E and 13F indicate that a fingerprint ridge forms a "Y" and an "X" configuration, respectively. Particularly these latter types of features are useful in fingerprint analysis.

There has thus been shown and described a novel connectivity-determining apparatus which fulfills all the objects and advantages sought therefor. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. Apparatus for determining the two-dimensional connectivity of a prescribed binary variable associated with a surface between remote points on said surface, said apparatus comprising in combination:
   (a) a single two-dimensional array of spatially located circuit nodes all located in one plane;
   (b) a plurality of circuit switches, each switch being conductively connected between at least two adjacent nodes and being operative to pass an unimpeded signal between said adjacent nodes when in a closed position and to block the passage of a signal between said adjacent nodes when in an open position;
   (c) a two-dimensional array of binary sensors, each sensor having a single spatial output and means for sensing the binary state of said variable at a respective point on said surface; and
   (d) means, connected to said sensors, for directly controlling the individual positions of said circuit switches in response to the individual states of said variable as sensed by respective ones of said sensors, each sensor being associated with a corresponding spatially located node in the respective array and two adjacent nodes are connected together by said switches whenever a given state of said variable is sensed by the sensors associated with said two adjacent nodes.

2. The apparatus defined in claim 1, wherein each node has associated therewith a plurality of switches each interconnecting such node with one of its neighboring nodes, and wherein all of the switches associated with a given node are controlled together to be in the open position or the closed position, respectively, in dependence upon the binary state of said variable as determined by the sensor associated with that given node.

3. The apparatus defined in claim 2, wherein each node is interconnected to all of its neighboring nodes by said switches.

4. The apparatus defined in claim 1, further comprising a plurality of input/output ports coupled to individual nodes on the perimeter of said array of nodes for applying signals to, and receiving signals from said individual nodes.

5. The apparatus defined in claim 4, wherein each one of the nodes on said perimeter of said array is coupled to at least one input/output port.

6. The apparatus defined in claim 4, wherein one of said switches is connected between each node and its associated input/output port.

7. The apparatus defined in claim 4, wherein there are a plurality of banks of input/output ports arranged around the perimeter of said array of nodes, each bank having a number of input/output ports connected to a like number of adjacent nodes.

8. The apparatus defined in claim 1, wherein said surface is a human finger and said variable is the presence or absence of a fingerprint ridge on the finger surface.

9. The apparatus defined in claim 1, wherein said surface is a printed circuit board and said variable is the presence or absence of an electronic circuit lead on the board surface.

10. The apparatus defined in claim 1, wherein said sensors are radiation sensors and each sensor includes means for sensing the presence or absence of radiation emanating from its associated point on said surface.

11. The apparatus defined in claim 10, wherein said radiation is light.

12. The apparatus defined in claim 1, wherein said arrays of nodes and sensors are rectangular, MxN arrays.

13. The apparatus defined in claim 1, wherein said arrays of nodes and sensors are triangular arrays.

14. The apparatus defined in claim 1, wherein said arrays of nodes and sensors are hexagonal arrays.

15. The apparatus defined in claim 1, further comprising first means for applying a voltage to at least one node and second means for sensing whether this voltage is present at at least one other node.

16. The apparatus defined in claim 15, wherein said first means applies a voltage to a plurality of first nodes on the perimeter of said array of nodes, and wherein said second means senses the presence of said voltage at a plurality of second nodes on the perimeter of said array of nodes, thereby to determine the connectivity between nodes of said array.

17. The apparatus defined in claim 15, wherein said first means applies a voltage to a floating node in the interior of said array of nodes and wherein said second means senses the presence of said voltage at a plurality of second nodes on the perimeter of said array of nodes, thereby to determine the connectivity between nodes of said array.

* * * * *